July 31, 1934. P. J. STUPARICH 1,968,328

PROCESS OF MAKING INLAID MOUNTS

Filed June 5, 1933

*INVENTOR.*
PAUL J. STUPARICH

Patented July 31, 1934

1,968,328

UNITED STATES PATENT OFFICE 1,968,328

PROCESS OF MAKING INLAID MOUNTS

Paul J. Stuparich, San Francisco, Calif.

Application June 5, 1933, Serial No. 674,413

2 Claims. (Cl. 41—35)

The present invention relates generally to improvements in the process or method of producing inlaid mounts of various colors and textures for photographs, advertising novelties, and the like; and has especial reference to the production of mountings for photographic folders, such as those used in mounting pictures or portraits of individuals.

The primary object of the invention is the provision of a mount of the class indicated, that is provided with inlaid sections of various colors and patterns, or designs which vary in color from the coloring of the frame or front sheet of the mount, to provide pleasing contrasts between the inlaid section and the frame of the mounts, also to provide an inlaid mount of sharper definition than is possible with the ordinary printed photographic mounting.

Another object of the invention is the provision of a mount of the class described that is composed of pleasing vari-colored and designed frame sections combined with vari-colored inlaid sections of irregular form or shape, relative to the picture frame sections of the mount.

A further object of the invention is to provide a picture or photographic mount that is extremely simple in character, and that may be easily and quickly produced at a minimum cost.

A still further object of the invention is the provision of an inlaid mount of the class indicated, in which warping of the frame and inlaid section is completely obviated by reason of the special treatment given the mount in the assemblage of the various elements constituting the same.

A still further object of the invention is the provision of a photographic mount which consists of but three thicknesses of material and the folder section thereof.

Other objects and advantages of the invention will appear with reference to the subjoined specification and the accompanying one sheet of drawing in which:—

In the art of producing photographic mounts, it is the usual practice to print the frames in various designs and colors, and to imprint thereon an imitation inlay of a contrasting color.

Photographic mounts thus produced do not give the desired artistic contrasts between colors and designs nor is the definition between the borders of the printed inlay designs and the printed frames thereof, properly and clearly defined; besides, numerous plies of material are required to build up these laminated units, thereby making them complicated and hence costly to produce.

In producing photographic mounts in accordance with the present invention, it is desired to eliminate all unnecessary operations and to greatly lessen the costs of production thereof, by reducing the number of elements embodied therein and necessarily the reduction of the number of operations required in their assemblage.

The various steps in the production of photographic mounts in accordance with the present invention, are as follows:—

Figure 1:
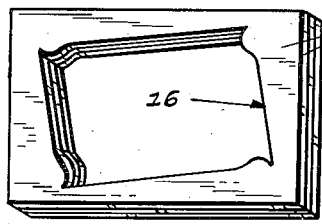
Figure 1 is a perspective view illustrating a plurality of frames or front sheets, showing the irregular punched openings therein, forming the outline of the designs of the inlay sections, which openings are punched by means of a special die for the purpose.
Figure 2:
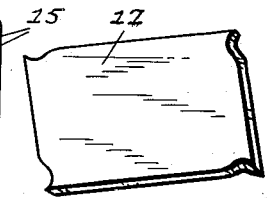
Figure 2 is a perspective view illustrating one of the inlay punchings which form the inlaid sections of the mount.

Referring first to Figures 1 and 2, a plurality of sheets or blanks 15 of vari-colored design are assembled and squared, and a die (not shown) is forced through the stack of blanks, said die being of irregular and artistic form and providing an irregular opening 16 of any desired design in the blanks, for instance, as disclosed in Figure 1.

The punchings or blanks 17, Figure 2, thus secured being of various colors and designs, now comprise the inlay sections. These punchings are now assembled in the frames 15 in accordance with desired color contrasts together with a backing sheet 18, Figure 3.

Figure 3:
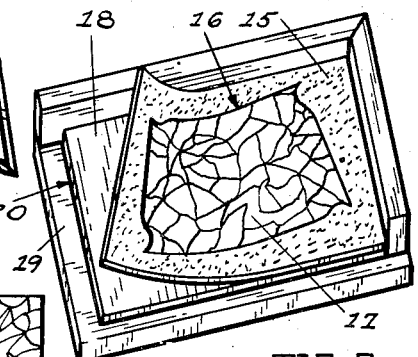
Figure 3 is a perspective view illustrating the assembling board which is used to square the backing sheet and frame, and in which the backing sheets, frames, and inlays are assembled.
Figure 4:
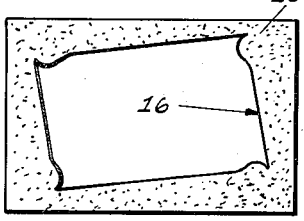
Figures 4 and 5 illustrate plan views of punched frames having various markings, and vari-colored designs and prints,—these constituting a set for a mount.
Figure 5:
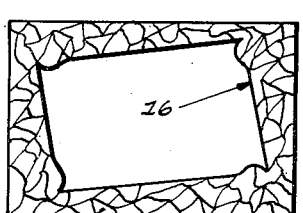

In Figure 3 it will be observed that an assembling board 19 is utilized to square and assemble the backing sheet 18, frame 15 and inlay section 17 constituting a unit, a coat of paste being, of course, first applied to the backing sheet, which causes the adherence together as a unit of the backing sheet, frame and inlay.

Figure 6:
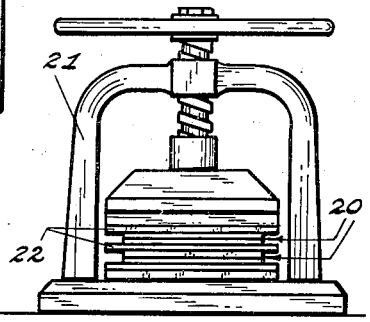
Figure 6 illustrates an ordinary hand press in which is shown a plurality of mount units constituted of the backing sheets, frames and inlay sections after they have been squared, pasted and assembled in units on the assembling board.

A plurality of these units 20 are then placed in a hand press 21, Figure 6, with proper spacing elements 22 therebetween to keep them separated, the press being utilized to cause the close adherence of the various parts constituting the pasted unit, namely, the backing sheets 18, frames 15 and the inlay sections 17 arranged in the irregular openings 16 of the frames.

Figure 7:
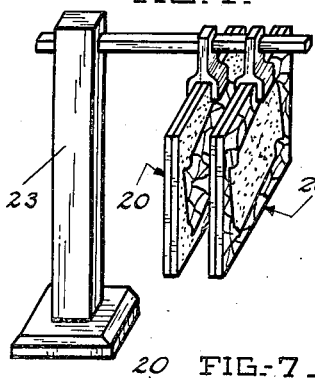
Figure 7 is a perspective view of the drying rack, illustrating the method of holding and suspending the pasted and pressed units for aerating and drying purposes.

These pasted and pressed units 20 are now placed on an aërating and drying stand 23, Figure 7, to become thoroughly dried and aërated. The dried units are next passed through a set of rolls 24 and 25, the roll 24 thereof being roughened to produce the egg shell effect on the exposed surfaces of the units, said rolls also tending to press out any irregularities or wrinkles developed during the pasting and drying operations.

Figure 9:
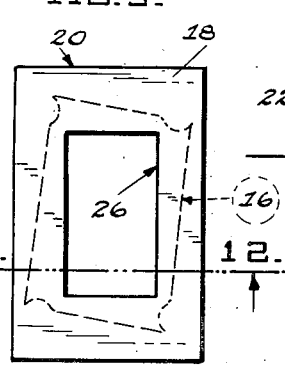
Figure 9 is a rear elevaiton of one of the inlaid frames, with the backing sheet and inlay in place after the frame opening has been punched therein.
Figure 10:
Figure 10 illustrates the punching which has been punched from the backing sheet and inlay sections.
Figure 8:
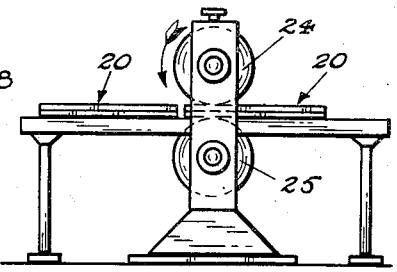
Figure 8 illustrates a set of rolls between which a unit is shown, said rolls tending to smooth the wrinkles out of the pasted units and produce an egg shell surface on the face of the units.

After the drying operation has been completed, the units 20 are again punched from the rear side, or the backing side 18, Figure 9, by means of a suitable die (not shown) to produce the rectangular frame opening 26, which opening is punched through the backing sheet 18 and thence through the inlay section 17, the punching 27, Figure 10, being removed and discarded.

Figure 11:
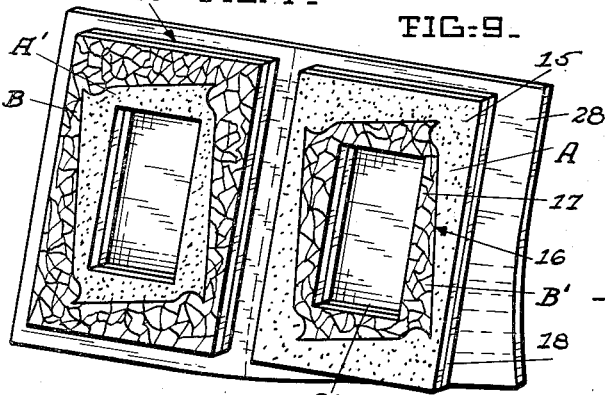
Figure 11 is a perspective view illustrating the entire assembly of elements which constitute the completed mount.
Figure 12:
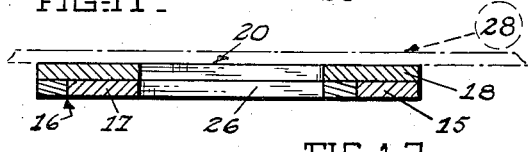
Figure 12 is a transverse sectional detail (greatly enlarged) taken on the line 12—12 of Figure 9, and illustrating the folder in dot and dash lines, and the inlay and frame sections in their respective positions.

The finished units 20 are now secured to the folder 28, as disclosed in Figure 11, by pasting the upper inner edges to the folder as disclosed, and photographs or the like are placed under the units 20 and are exposed through the openings 26 of the mount.

The finished mount disclosed in Figure 11 shows the finished assemblage of the vari-colored and marked frames together with their inlays of contrasting colors and markings, said frames and inlays being transposed. For instance, the inlay A' cut from the frame A is mounted in the frame B and the inlay B' cut from the frame B is mounted in the frame A, thus producing an artistic and pleasing contrast between the various sections of the finished mount.

I claim and desire to secure by Letters Patent of the United States the following:

1. A photographic mount comprising a pair of ornamented frames having a common backing, said frames being formed from ornamental material, the materials in said frames differing from each other, an inlaid design of identical outline in each of said frames, the inlay in each frame consisting of the material comprising the other frame.

2. The process of producing inlaid photographic mounts which consists in stacking two blanks of differently ornamented materials, simultaneously punching from each of said blanks identical sections, assembling the section punched from one blank in the opening formed in the other blank, mounting the assembled sections and blanks on a backing, and finally punching the conventional opening therethrough.

PAUL J. STUPARICH.